(12) United States Patent
Wang et al.

(10) Patent No.: US 11,325,638 B2
(45) Date of Patent: May 10, 2022

(54) DUAL-MODE ACTIVE REAR-WHEEL STEERING DEVICE

(71) Applicant: Jilin University, Jilin (CN)

(72) Inventors: Junnian Wang, Jilin (CN); Tingxu Yan, Jilin (CN); Dedong Guo, Jilin (CN); Kai Wang, Jilin (CN)

(73) Assignee: Jilin University, Changchun (CN)

( * ) Notice: Subject to any disclaimer, the term of this patent is extended or adjusted under 35 U.S.C. 154(b) by 412 days.

(21) Appl. No.: 16/706,670

(22) Filed: Dec. 6, 2019

(65) Prior Publication Data

US 2021/0009190 A1    Jan. 14, 2021

(30) Foreign Application Priority Data

Jul. 11, 2019    (CN) .......................... 201910623728.2

(51) Int. Cl.
*B62D 3/02* (2006.01)
*B60K 17/04* (2006.01)
*B60K 17/24* (2006.01)
*F16H 3/62* (2006.01)
*F16H 37/04* (2006.01)
(Continued)

(52) U.S. Cl.
CPC .............. *B62D 3/02* (2013.01); *B60K 17/046* (2013.01); *B60K 17/24* (2013.01); *B60K 17/30* (2013.01); *B62D 5/0421* (2013.01); *B62D 5/06* (2013.01); *B62D 7/146* (2013.01); *B62D 7/16* (2013.01); *B62D 7/18* (2013.01); *B62D 17/00* (2013.01); *F16H 3/62* (2013.01); *F16H 37/042* (2013.01); *F16H 2200/0034* (2013.01)

(58) Field of Classification Search
CPC ........ B62D 3/02; B62D 5/0421; B62D 7/146; B62D 17/00; B60K 17/046; B60K 17/24; B60K 17/30; F16H 3/62; F16H 37/042
See application file for complete search history.

(56) References Cited

U.S. PATENT DOCUMENTS

| 5,554,969 A | * | 9/1996 | Eguchi | ............... B62D 15/0225 |
| | | | | 180/404 |
| 6,522,962 B2 | * | 2/2003 | Millsap | ............... B62D 5/0403 |
| | | | | 180/443 |

(Continued)

FOREIGN PATENT DOCUMENTS

| CN | 108608846 A | 10/2018 |
| CN | 109353332 A | 2/2019 |

(Continued)

*Primary Examiner* — Tony H Winner
*Assistant Examiner* — Michael R Stabley (57) ABSTRACT

A dual-mode active rear-wheel steering device, including: a steering motor, a main shaft, an intermediate gear, a transmission gear, a planetary gear coupling mechanism and a mode switching assembly. An output end of the steering motor is provided with a first input gear. An end of the main shaft drives a first rear wheel to rotate by a two-stage gear transmission system and a first rear-wheel motion conversion mechanism, and the other end of the main shaft drives a second rear wheel to rotate by the planetary gear coupling mechanism and a second rear-wheel motion conversion mechanism. The intermediate gear, the transmission gear and a sun gear of the planetary gear coupling mechanism are provided on the main shaft. The intermediate gear meshes with the first input gear.

16 Claims, 5 Drawing Sheets

(51) Int. Cl.
*B62D 17/00* (2006.01)
*B60K 17/30* (2006.01)
*B62D 7/14* (2006.01)
*B62D 5/06* (2006.01)
*B62D 7/16* (2006.01)
*B62D 7/18* (2006.01)
*B62D 5/04* (2006.01)

(56) References Cited

U.S. PATENT DOCUMENTS

| | | | | |
|---|---|---|---|---|
| 7,245,130 B2* | 7/2007 | Murphy | ............... | B60L 3/0023 |
| | | | | 324/546 |
| 8,243,609 B2* | 8/2012 | Sakurai | ............... | H04L 43/0817 |
| | | | | 370/242 |
| 8,996,254 B2* | 3/2015 | Nishikawa | .......... | B60W 50/023 |
| | | | | 701/41 |
| 9,199,639 B2* | 12/2015 | Yamakado | ............ | B60T 8/1755 |
| 9,783,229 B2* | 10/2017 | Mukai | ...................... | B62D 6/00 |
| 9,873,449 B2* | 1/2018 | Magisson | ............ | B60K 17/356 |

FOREIGN PATENT DOCUMENTS

| | | |
|---|---|---|
| CN | 109664868 A | 4/2019 |
| CN | 109878570 A | 6/2019 |
| CN | 209096808 U | 7/2019 |

* cited by examiner

DUAL-MODE ACTIVE REAR-WHEEL STEERING DEVICE

CROSS-REFERENCE TO RELATED APPLICATIONS

This application claims the benefit of priority from Chinese Patent Application No. 201910623728.2, filed on Jul. 11, 2019. The content of the aforementioned application, including any intervening amendments thereto, is incorporated herein by reference in its entirety.

TECHNICAL FIELD

The present application relates to security of automotive steering, and more particularly to a dual-mode active rear-wheel steering device.

BACKGROUND OF THE INVENTION

Rear-wheel steering, as an auxiliary steering technique, can improve steering flexibility and driving stability to some extent. The rear-wheel compliance steering technique represented by PSS of Citroen can passively meet the requirements of drivers for the steering assistance to some extent, but the abrasion of connectors may easily be caused, leading to a low controllability. The active rear-wheel steering technique can overcome the defects mentioned above. It can avoid understeering of vehicles at a low speed, improving the steering yaw gain and the steering flexibility in narrow spaces, and the oversteering of vehicles at a high speed is avoided to reduce the steering yaw gain and improve the stability under high-speed driving.

In recent years, different active rear-wheel steering techniques appear in many countries, successively. Some commercially available high-end models have been equipped with active rear-wheel steering systems. For example, Cadillac CT6 uses an ARS active rear-wheel steering system, in which a servo motor cooperates with a five-link suspension to realize a rear-wheel steering angle of up to 3.5°. BMW 7-series is also equipped with the Integral active steering system, in which the motor drives nuts to allow screws to generate an axial displacement, so that a rear-wheel steering angle of up to 3° is achieved. ZF Friedrichshafen AG develops an AKC active rear-wheel steering device which uses a brushless DC motor to drive a linkage mechanism to change the rear-wheel toe-in, thereby providing a steering angle of up to 6°. Audi A8L and the latest Porsche Panamera are equipped with a central actuator of this active rear-wheel steering system. All of the above applications of the active rear-wheel steering techniques use the central actuator, that is, only one motor is arranged near the rear axle and drives the left and right rear wheels to rotate in the same direction by the steering tie rod. Porsche 911Turbo and 911GT3 are equipped with dual actuators of AKC techniques of ZF Friedrichshafen AG, that is, two identical sets of motor actuators are arranged near left and right rear wheels, respectively to drive the two rear wheels to rotate in the same direction.

Under the steering operating mode, the active rear-wheel steering system can improve flexibility and stability of vehicles, however, under the braking operating mode, the rear axle is prone to side slipping, causing the instability of the whole vehicle. Thus, the rear-wheel toe-in can be controlled to be smaller, that is, the left and right wheels simultaneously rotate in the opposite directions and towards the inside of the vehicle body, so as to improve the directional stability of the vehicles under the braking operating mode. In the market, this technique is only applied in Honda Acura TXL that is mass-produced. In Honda Acura TXL, two motors are arranged near the left and right rear wheels, respectively and act as dual actuators to control the steering angle of the rear wheels.

Relatively speaking, the dual actuators can easily realize the rotation of the rear wheels in different directions, however, with more than one actuator, the steering system has a high cost and poor reliability. The damage of the motor actuator at one side may break the coordination of the movement of the left and right rear wheels, resulting in potential dangerous accidents.

SUMMARY OF THE INVENTION

The present invention provides a dual-mode active rear-wheel steering device, which uses a motor and a coupling mechanism to control two rear wheels to rotate in the same or opposite direction under different operating conditions, so that the active rear-wheel steering device has two modes of steering and braking.

The technical solution provided herein is described as follows.

A dual-mode active rear-wheel steering device, comprising:
an outer casing;
a main shaft;
an intermediate gear;
a planetary gear coupling mechanism;
a transmission gear; and
a mode switching assembly;
wherein a steering motor is fixedly provided on the outer casing, and a first input gear is coaxially arranged with and fixed on an output end of the steering motor;
the main shaft is rotatably arranged in a middle portion of the outer casing; one end of the main shaft is connected to a first rear-wheel motion conversion mechanism through a cylindrical two-stage gear transmission system to drive a first rear wheel to steer, and the other end of the main shaft is connected to a second rear wheel motion conversion mechanism through the planetary gear coupling mechanism to drive a second rear wheel to steer;
the intermediate gear is coaxially arranged with and fixed on the main shaft and coaxial with the cylindrical two-stage gear transmission system, and meshes with the first input gear;
the planetary gear coupling mechanism comprises a sun gear, a plurality of planetary gears, a planetary carrier, an inner ring gear sleeve, a first inner ring gear, a second inner ring gear and a plurality of pin shafts;
wherein the sun gear is coaxially arranged with and fixed at the other end of the main shaft;
the inner ring gear sleeve is rotatably arranged inside the outer casing;
the first inner ring gear is provided at one side of the inner ring gear sleeve, and is concentric with the sun gear;
the plurality of planetary gears are uniformly provided outside the sun gear in a circumferential direction, and respectively mesh with the sun gear and the first inner ring gear;
the planetary carrier is coaxially arranged with the sun gear in spaced manner, and the planetary carrier is coaxially arranged with and connected to the second rear-wheel motion conversion mechanism to drive the second rear wheel to rotate;

one end of each of the pin shafts rotatably passes through the corresponding planetary gears, and the other end of each of the pin shafts is fixedly provided on the planetary carrier; and the second inner ring gear is provided on the other side of the inner ring gear sleeve;

the transmission gear is coaxially arranged with and fixed on the main shaft and is provided between the sun gear and the intermediate gear;

one end of the mode switching assembly is coaxially provided with a second input gear that meshes with the transmission gear, and the other end of the mode switching assembly is coaxially provided with a second output gear that meshes with the second inner ring gear, which is configured to selectively drive or lock the first inner ring gear;

wherein when the mode switching assembly is disconnected, the first inner ring gear is locked to the outer casing by the mode switching assembly, and the planetary carrier is driven only by the sun gear on the main shaft, and then the second rear-wheel motion conversion mechanism is driven to operate; when the mode switching assembly is connected, the main shaft drives the sun gear and the first and second inner ring gears in the mode switching assembly to realize the speed coupling, thereby driving the second rear-wheel motion conversion mechanism.

In some embodiments, the mode switching assembly comprises an assembly casing, the second input gear, a second input shaft, a rotor friction plate, a second output shaft, a circular groove, a coil, a magnetic yoke, a torque adjusting ring, a stator friction plate and a plurality of springs;

wherein a first through hole, a second through hole and a third through hole that are coaxially arranged penetrate through a center of the assembly casing which is fixedly connected to the outer casing through a plurality of bolts;

the second input gear is arranged outside the assembly casing at an input side, and meshes with the transmission gear;

one end of the second input shaft is rotatably supported in the first through hole by a second input shaft bearing, and extends into the assembly casing; the other end of the second input shaft is coaxially arranged with and connected to the second input gear via a flat key;

the rotor friction plate, which is annular, is provided in the assembly casing and is coaxially arranged with and fixedly connected to an end face of the second input shaft that extends into the mode switching assembly;

one end of the second output shaft is rotatably supported in the third through hole by a first output shaft bearing, and extends into the assembly casing, and is coaxially arranged with and rotatably supported by the second input shaft; the other end of the second output shaft is coaxially arranged with and connected to the second output gear via a spline;

the circular groove is coaxially arranged with and provided in an inner wall of the assembly casing that is opposite to the rotor friction plate;

the coil is embedded and fixedly provided in the circular groove;

the magnet yoke is slidably sleeved on the second output shaft between the rotor friction plate and the coil by a spline pair;

the torque adjusting ring is provided in the second through hole of the mode switching assembly and a gap is arranged between the torque adjusting ring and a second through hole; a center of the torque adjusting ring is sleeved on the second output shaft through threads; an outer cylindrical surface of the torque adjusting ring is provided with adjusting teeth which force the torque adjusting ring to rotate on the second output shaft through a tool; and an end face of the torque adjusting ring facing the magnet yoke is provided with a circular-arc-shaped groove;

the stator friction plate, which is annular, is arranged outside the coil, and is fixedly provided on the inner wall of the assembly casing in a circumferential direction of the second through hole;

the plurality of springs are uniformly arranged around the second output shaft between the magnet yoke and the torque adjusting ring; one end of each of the springs contacts with the magnet yoke, and the other end of each of the springs is slidably contacted with the circular-arc-shaped groove of the torque adjusting ring; a pressing force of the springs is adjusted by rotating the torque adjusting ring;

wherein when the coil is energized, the magnet yoke compresses the springs, so that the magnet yoke abuts the stator friction plate, at one time, the magnet yoke is separated from the rotor friction plate and is locked by the assembly casing; when the coil is de-energized, the springs compress the magnet yoke, so that the magnet abuts the rotor friction plate, and the rotor friction plate and the magnet yoke are connected to rotate synchronously.

In some embodiments, the outer cylindrical two-stage gear transmission system comprises a first pinion gear, a transmission shaft, a first gear wheel, a second pinion gear and a second gear wheel;

wherein the first pinion gear is coaxially arranged with and fixed on the main shaft and located outside the intermediate gear;

two ends of the transmission shaft are rotatably arranged at the outer casing below the first pinion gear;

the first gear wheel is coaxially arranged with and fixed on the transmission shaft and located under the first pinion gear, and meshes with the first pinion gear;

the second pinion gear is coaxially arranged with the transmission shaft and located outside the first gear wheel;

the second gear wheel is arranged above the second pinion gear and meshes with the second pinion gear; the second gear wheel is coaxially arranged with and fixedly connected to the first rear-wheel motion conversion mechanism.

In some embodiments, the first rear-wheel motion conversion mechanism is same with the second rear-wheel motion conversion mechanism; the first rear-wheel motion conversion mechanism comprises a first nut, a first lead screw, a first steering tie rod and a first dust-proof cover; the second rear-wheel motion conversion mechanism comprises a second nut, a second lead screw, a second steering tie rod and a second dust-proof cover;

wherein the first nut and the second nut are rotatably arranged on the outer casing;

one end of the first lead screw is provided in the first nut and is in clearance fit with the first nut via balls, and is capable of moving along an axial direction of the first nut, and the other end of the first lead screw extends out of the outer casing; one end of the second lead screw is provided in the second nut and is in clearance fit with the second nut via balls, and is capable of moving along an axial direction of the second nut and the other end of the second lead screw extends out of the outer casing;

one end of the first steering tie rod is connected to the other end of the first lead screw via a first ball pin, and the other end of the first steering tie rod is connected to a first steering knuckle arm of a corresponding wheel via a second ball pin, thereby realizing a deflection of the wheel; one end of the second steering tie rod is connected to the other end of the second lead screw via a first ball pin, and the other end of the second steering tie rod is connected to a second steering knuckle arm of a corresponding wheel via a second ball pin, thereby realizing a deflection of the wheel; and the first dust-proof cover is sleeved on the first lead screw, and located outside the outer casing, and two ends of the first dust-proof cover are respectively fixed to the outer casing and the first lead screw via clamps; and the second dust-proof cover is sleeved on the second lead screw, and located outside the outer casing, and two ends of the second dust-proof cover are respectively fixed to the outer casing and the second lead screw via clamps.

In some embodiments, the mode switching assembly further comprises a boss, a plurality of through holes, a plurality of spring seats, a rotor friction sheet and a stator friction sheet;

wherein the boss is provided on the second output shaft and located between the magnet yoke and the torque adjusting ring, and integrally formed with the second output shaft;

the plurality of through holes are uniformly provided on the boss along a circumferential direction of the boss;

each of the spring seats is a special-shaped cylinder; a plane end of each of the spring seats contacts with the other end of each of the springs, and the spring seats are arranged in corresponding through holes and are capable of moving along an axial direction of the through holes; a curved end of each of the spring seats slidably contacts with the torque adjusting ring;

the rotor friction sheet is annular and coaxially fixed on a side of the rotor friction plate which faces the magnet yoke;

the stator friction sheet is annular, and coaxially arranged with and fixed on a side of the stator friction plate which faces the magnet yoke.

In some embodiments, the first lead screw and the first nut of the first rear-wheel motion conversion mechanism and the second lead screw and the second nut of the second rear-wheel motion conversion mechanism have identical parameters except that rotational directions thereof are opposite.

In some embodiments, the other end of the main shaft is rotatably supported on the planetary carrier.

In some embodiments, the rotatable arrangement or the rotatable support is achieved by bearings.

In some embodiments, the tooth number of the first pinion gear, the second pinion gear, the first gear wheel and the second gear wheel satisfies the following equations:

$$\frac{z_{290} z_{270}}{z_{260} z_{280}} = \frac{1}{1+\alpha};$$

$$z_{290} + z_{260} = z_{270} + z_{280};$$

$$\alpha = \frac{z_q}{z_t};$$

wherein $\alpha$ is the ratio of the tooth number $Z_q$ of the first inner ring gear to the tooth number $Z_t$ of the sun gear; $Z_{260}$ is the tooth number of the first gear wheel; $Z_{290}$ is the tooth number of the first pinion gear; $Z_{270}$ is the tooth number of the second pinion gear; $Z_{280}$ is the tooth number of the second gear wheel.

In some embodiments, the transmission ratios of gears at an input end and an output end of the mode switching assembly satisfy the following equation:

$$1 + \frac{\alpha}{i_t i_c} = -1$$

wherein $i_t$ is the transmission ratio of the gears at the input end of the mode switching assembly, and $i_c$ is the transmission ratio of the gears at the output end of the mode switching assembly.

The beneficial effects of the present invention are described as follows.

1. The dual-mode active rear-wheel steering device provided in this invention adopts only one set of motor actuator to control two rear wheels to rotate in the same direction or opposite directions under two driving conditions of steering and braking, so that the active rear-wheel steering device has two modes, that is, the device rotates in the same direction under the steering mode, and the device rotates in different directions under the braking mode. Moreover, even if the motor fails, due to the mechanical self-locking function of the screw-nut pair, the mechanical connection is ensured to be stable and reliable, ensuring the driving security.

2. A 2K-H-typed planetary gear coupling mechanism is adopted in the invention and has a large transmission ratio variation range to facilitate the achievement of the speed coupling during the dual-mode switching and to match different steering motors, and the mechanism has a compact structure and small size, thereby simplifying the whole vehicle matching.

3. The invention uses only one motor, one planetary gear coupling transmission mechanism that is 2K-H-typed and one mode switching assembly to make two rear wheels to rotate in the same and opposite directions under two operating conditions of steering and braking, realizing dual-mode active steering control, thereby reducing the number of actuator motors, the system complexity and the cost.

4. The invention adopts the screw-nut mechanism as the rear-wheel motion conversion mechanism to convert the rotational motion of the motor and all the transmission shafts into the translation of the tie rods. Moreover, due to the self-locking function of the screw-nut pair, the motor can be unloaded when automotive steering and braking are not required. Due to the mechanical effect of the screw-nut, the disturbance from the road can be resisted to reduce the working energy consumption.

5. The steering mode which is more common can be maintained without extra energy input due to self-friction of the mechanical structure of this invention, thereby greatly reducing the working energy consumption and improving the reliability.

DETAILED DESCRIPTION OF EMBODIMENTS

The present invention will be further described in detail below with reference to the accompanying drawings, so that those skilled in the art can implement the invention according to the description of the present invention.

Figure 1:
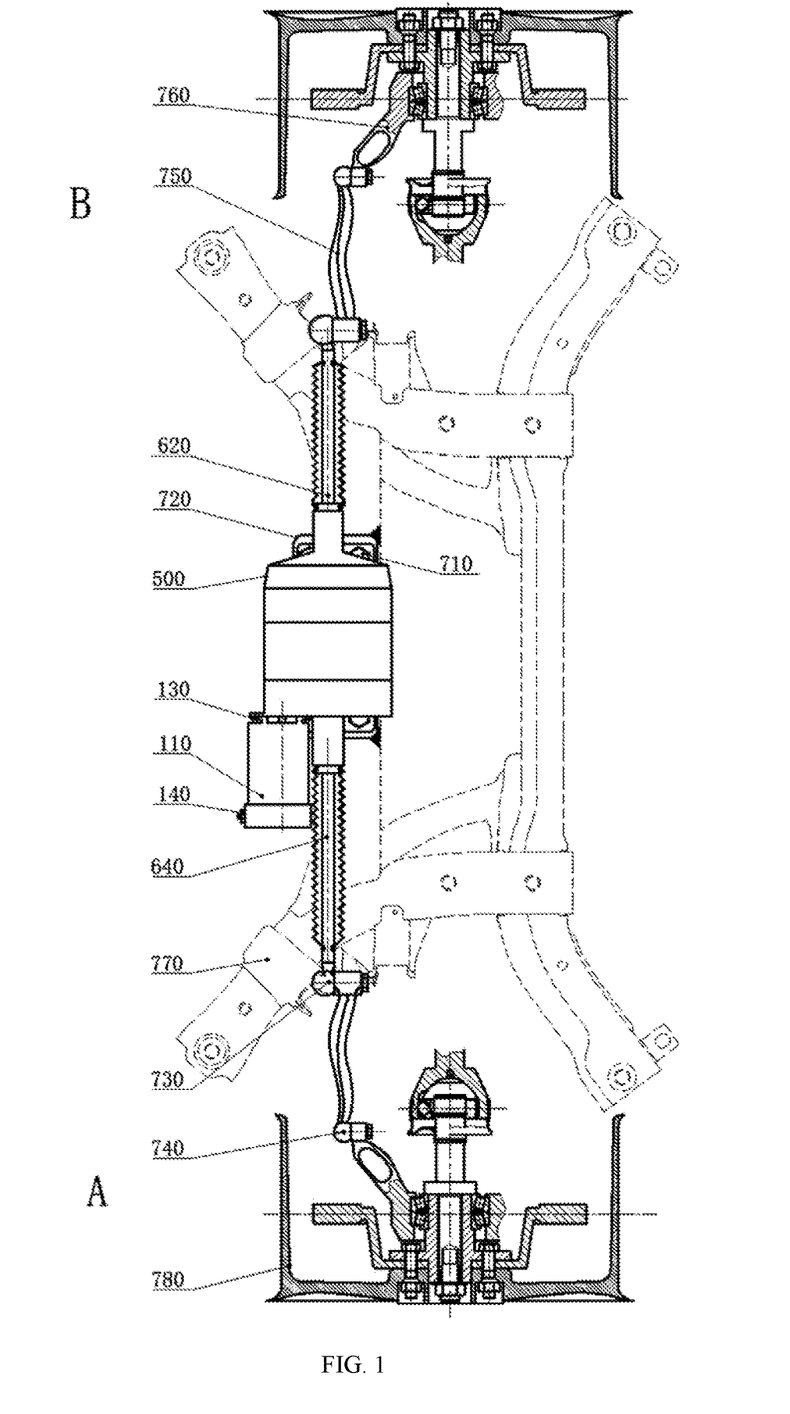
FIG. 1 is a schematic diagram showing a dual-mode active rear-wheel steering device arranged on a rear axle according to the invention.

FIG. 1 schematically shows a dual-mode active rear-wheel steering device, in which the dual-mode active rear-wheel steering device is arranged on a rear axle. The dual-mode active rear-wheel steering device includes a steering motor (servo motor 110), a transmission gear set, a mode switching assembly, a planetary gear coupling mechanism, an outer casing 500, two rear-wheel motion conversion mechanisms, two steering tie rods 750, two rear wheels 780. Where the steering motor is horizontally fixed on a rear axle subframe 770, and an axis of the steering motor is perpendicular to a longitudinal axis of vehicles. The steering motor and the outer casing 500 are arranged in sequence along a transverse direction. A motor output shaft 120 is splined to a first input shaft 230 of the transmission gear set, and the transmission gear set can transmit the motion which is reduced in speed and increased in torque to a first motion conversion mechanism at A side, and transmit the rotation to the mode switch assembly and the planetary gear coupling mechanism, respectively, which are located at B side, where the mode switch assembly can connect or disconnect to the planetary gear coupling mechanism, and a second rear-wheel motion conversion mechanism at B side is arranged at an output end of the planetary gear coupling mechanism. Each of the two rear-wheel motion conversion mechanisms converts the rotational motion around an axis thereof into the translation along the axis. It should be noticed that, for vehicles with only front-wheel steering, generally, a rear suspension is provided with a rear-wheel toe-in control arm to manually repair and adjust the toe-in of each of the two rear wheels. For vehicles with four-wheel steering, the connection between the rear-wheel toe-in control arm and the frame is canceled and replaced by the connection between the rear-wheel toe-in control arm and an output end of each of the two rear-wheel motion conversion mechanisms by a ball pin, so that the steering motion of the two rear wheels can be automatically controlled in real-time. At the same time, since the two rear wheels are required to realize the coupling of the pulsing and rotating motions, the original pin shaft connection between the control arm and a wheel is changed to the ball pin connection between each of the two steering tie rods 750 and each of two steering knuckle arms 760 of the two rear wheels. Therefore, the output end of each of the two rear-wheel motion conversion mechanisms connects to an end of each of the two steering tie rods 750 through a first ball pin 730, and the other end of each of the two steering tie rods 750 connects to each of the two steering knuckle arms 760 of the two rear wheels through a second ball pin 740. Thus, the translation outputted by the two rear-wheel motion conversion mechanisms at the output ends can lead to the dragging for the two steering knuckle arms which drives the two rear wheels 780 to realize the deflection.

Figure 2:
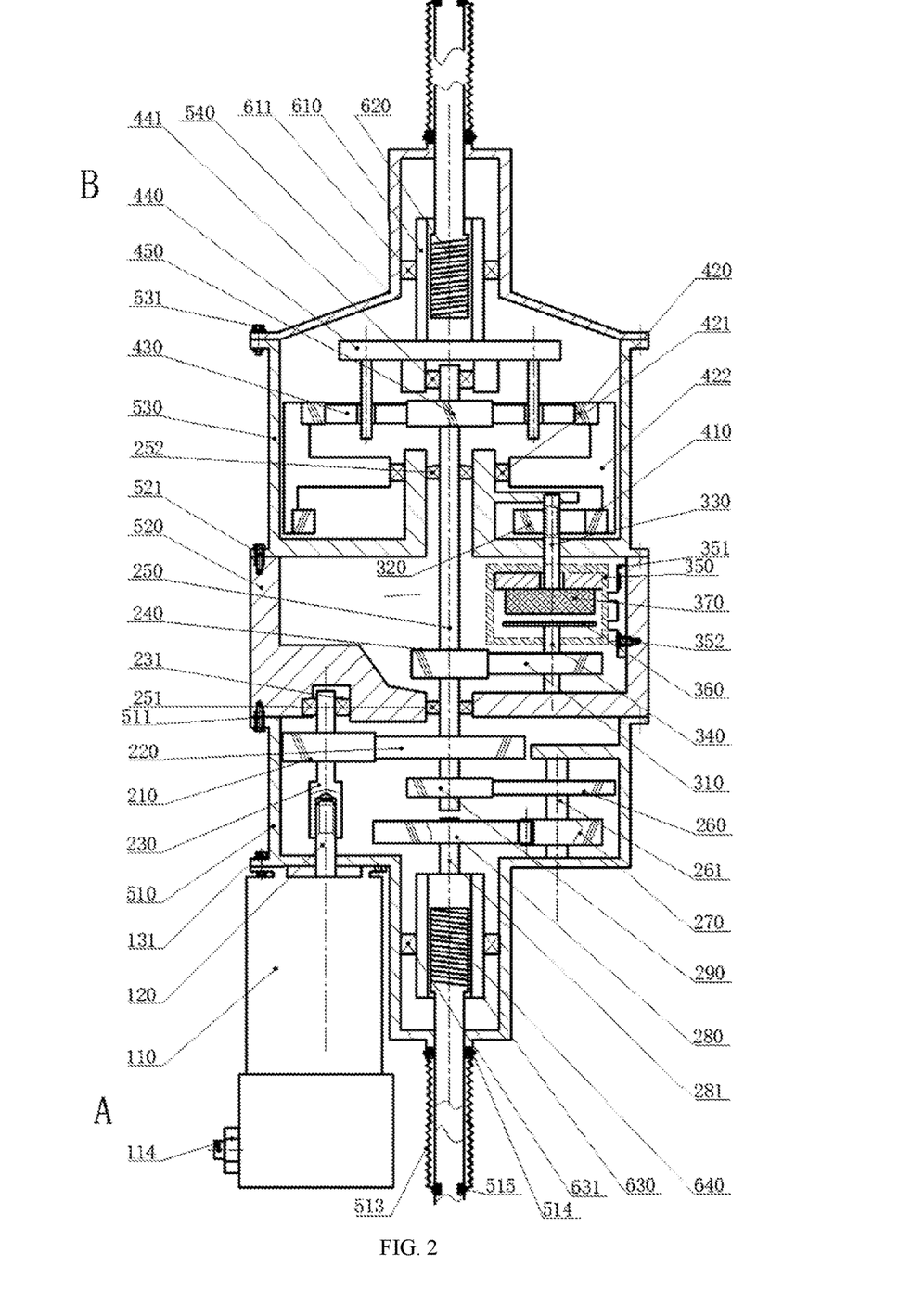
FIG. 2 is a schematic diagram of the dual-mode active rear-wheel steering device according to the invention.

As shown in FIG. 2, the outer casing 500 of the dual-mode active rear-wheel steering device includes a first casing 510, a second casing 520, a third casing 530 and a fourth casing 540, where the first casing 510 mainly accommodates the first rear-wheel motion conversion mechanism and a part of the transmission gear set including an input end and components used to transmit the rotation to the A side. The second casing 520 mainly accommodates the mode switching assembly and components of the transmission gear set used to transmit the rotation to the B side. The third casing 530 mainly accommodates the planetary gear coupling mechanism. The fourth casing 540 mainly accommodates the second rear-wheel motion conversion mechanism at an output end of B side. The first casing 510, the second casing 520, the third casing 530 and the fourth casing 540 are successively connected via a first connecting screw 511, a second connecting screw 521 and a connecting bolt 531.

The steering motor of this invention is required to meet the requirements of bidirectional rotation, precise and controllable rotation angle, swift response, high torque overload capacity, stable operation and small moment of inertia and size. The steering motor is preferably a DC servo motor 110, as shown in FIG. 2. The DC servo motor 110 requires external DC power and needs to connect a signal line for being controlled by signals of controllers. A motor casing is preferably provided with a motor terminal 140 which includes a DC power input line and the signal line connecting the controller.

As shown in FIGS. 1 and 2, an output end of the steering motor is designed with a first flange 130, on which through holes are arranged in a circumferential direction, and the number of the through holes is preferably 6. A second flange is provided at an upper portion of an input end of the first casing 510 of the outer casing 500. The first casing and the second flange are provided with through holes sharing the same position and size. The first flange 130 connects to the first casing 510 via a motor fixing bolt 131 to connect the steering motor and the outer casing 500. The rotation of a rotor of the servo motor 110 is outputted by the motor output shaft 120 to the transmission gear set.

The transmission gear set of this invention transmits the torque outputted by the motor, distributes the rotational motion to both A side and B side and ensures that the transmission ratio of the A side matches the transmission ratio of the planetary gears located at the B side. With reduced speed and increased torque, the steering angles of the wheels at two sides match with each other.

As shown in FIG. 2, the transmission gear set is actually a cylindrical two-stage gear transmission system, mainly including: a first input gear 210, an intermediate gear 220, the first input shaft 230, a first input shaft bearing 231, a transmission gear 240, a main shaft 250, a first gear wheel 260, a transmission shaft 261, a second pinion gear 270, a second gear wheel 280, a first output shaft 281 and a first pinion gear 290. An end face of the first input shaft 230 is provided with a blind hole that is provided with an internal spline, and a surface of the motor output shaft 120 is provided with an external spline, and the first input shaft and the motor output shaft are connected via a pair of splines. One end of the first input shaft 230 is supported on the second casing 520 via the first input shaft bearing 231, and the first input shaft 230 connects to the first input gear 210 via a key for transmission. The first pinion gear 290, the intermediate gear 220, the transmission gear 240 and a sun gear 450 are sequentially arranged at the main shaft 250 from the A side to B side. These gears connect to the main shaft 250 via a flat key and rotate with the main shaft in the same rotational speed and direction. One end of the main shaft 250 is supported on the second casing 520 via a first main shaft bearing 251, and the other end of the main shaft 250 is supported on the third casing 530 via a second main shaft bearing 252. The intermediate gear 220 and the first input gear 210 externally mesh through helical gears with a transmission ratio of $i_{in}$. The intermediate gear 220 drives the main shaft 250 to rotate synchronously.

The transmission shaft 261 is supported in the first casing 510 via a bearing. An end of the transmission shaft 261 is supported in a through hole of the first casing, and the other end of the transmission shaft 261 is supported in a blind hole of the first casing. The transmission shaft 261 respectively connects to the first gear wheel 260 and the second pinion gear 270 through a flat key, to allow the transmission shaft 261, the first gear wheel 260 and the second pinion gear 270 to rotate in the same rotational speed and direction. The first pinion gear 290 is externally meshed with the first gear wheel 260; the second pinion gear 270 is externally meshed with the second gear wheel 280. After the two-stage external gear transmission, the rotation of the A side is reduced in speed and increased in torque. The second gear wheel 280 connects to the first output shaft 281 through a flat key. The rotation speed of the output end of the B side is determined by the main shaft 250, the mode switching assembly and the planetary gear coupling mechanism.

Figure 3:
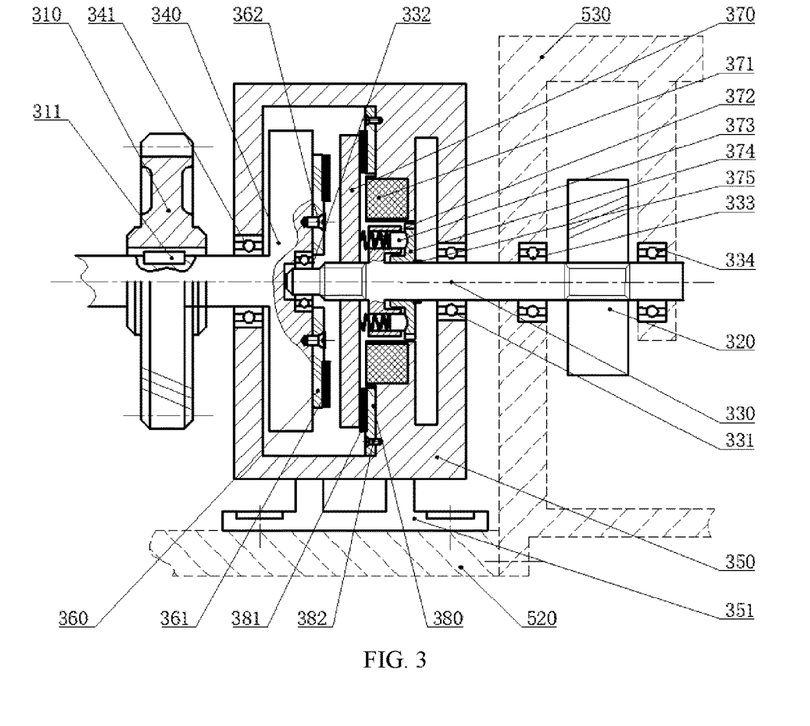
FIG. 3 is a schematic diagram of a mode switching assembly according to the invention.

As shown in FIG. 3, the mode switching assembly of this invention is designed as an independent and integrally replaceable structure. The input and output ends of the mode switching assembly have a simple structure and are easy for connection, thereby facilitating maintenance and assembly. The mode switching assembly functions for determining whether an internal ring gear of the planetary gear coupling mechanism is driven to rotate. The mode switching assembly mainly includes a second input gear 310, a hub flat key 311, a second output gear 320, a second output shaft 330, a first output shaft bearing 331, a second output shaft bearing 332, a third output shaft bearing 333, a fourth output shaft bearing 334, a second input shaft 340, a second input shaft bearing 341, an assembly casing 350, a third flange 351, a plurality of flange screws 352, a rotor friction plate 360, a rotor friction sheet 361, a plurality of rotor screws 362, a magnet yoke 370, a coil 371, a plurality of springs 372, a plurality of spring seats 373, a torque adjusting ring 374, a snap ring 375, a stator friction plate 380, a stator friction sheet 381 and a plurality of stator screws 382.

As shown in FIGS. 2 and 3, the transmission gear 240 is externally meshed with the second input gear 310 with a transmission ratio of $i_t$ ($i_t$ is minus, indicating an opposite rotation direction). A key slot is milled on the second input shaft 340, and through the key slot, the second input shaft 340 is connected to the second input gear 310 via the hub flat key 311. A first through hole, a second through hole and a third through hole which are coaxially arranged penetrate the center of the assembly casing 350. One end of the second input shaft 340 is supported on the second casing 520, and the other end of the second input shaft passes the second input shaft bearing 341 and is supported by the first through hole of the assembly casing 350. A section of the second input shaft 340 inside the assembly is designed as a circular plate having a large size, as shown in FIG. 3, and a step-shaped blind hole is provided at an end face of the circular plate. The second output shaft bearing 332 is provided in the step-shaped blind hole to support a small end of the second output shaft 330. Since the second input shaft 340 always rotates with the main shaft 250 under any operating conditions as long as the steering motor is powered on, the second input shaft can be considered as a rotor. The rotor friction plate 360 is fixed to the second input shaft 340 by the rotor screws 362 with a preferred number of 6. The rotor friction sheet 361 is welded or bonded to the rotor friction plate 360. One side of the magnet yoke 370 and the rotor friction sheet 361 can be in contact and be compressed. At this point, the operating condition is in a steering mode which is more common. This mode can be maintained in the present invention due to the springs and mechanical self-friction without an extra energy input, thereby greatly reducing the energy consumption and improving the reliability.

The magnet yoke 370 is slidably connected to the second output shaft 330 by a spline, and the other side of the magnet yoke 370 and the stator friction sheet 381 can be in contact and be compressed. The stator friction sheet 381 is fixed to a surface of the stator friction plate 380 by bonding or welding. The stator friction plate 380 is fixed on the assembly casing 350 via the stator screws 382. The coil 371 is bonded to an inner surface of the assembly casing 350, and an axis of the coil is parallel to the magnet yoke 370. The second output shaft 330 is designed as having a structure with a special-shaped boss, and the boss is provided with through holes distributed in a circumferential direction, where the number of the through holes is preferably 6-8. The through holes each are provided with a spring 372, and one end of each of the springs contacts with the magnet yoke 370, and the other end of each of the springs contacts with respective spring seats 373 which are a special-shaped cylinder. A plane end of each spring seat contacts with the springs, and the spring seat is arranged in each of the through holes and can move along an axial direction of respective through holes; and the other curved end of the spring seat slidably contacts with the torque adjusting ring which is provided in the second through hole of the assembly casing and keeps a large gap with respective through holes. The torque adjusting ring connects with an outer surface of the second output shaft by screw thread and rotates with the second output shaft 330. An outer cylindrical surface of the torque adjusting ring is provided with adjusting teeth which can force the torque adjusting ring to rotate on the second output shaft by tools. The torque adjusting ring 374 can be rotated to obtain other axial positions, so that the spring seat 373 is pushed to compress the spring, thereby overcoming insufficient compression force caused by a decrease in the thickness of the worn rotor friction sheet 361 (it should be explained that the torque adjusting ring 374 is rotated under non-operating state of the whole mechanism to adjust the compression force manually, which can be considered as an adjustment or maintenance to ensure enough compression force). The snap ring 375 is provided at an outer end face of the torque adjusting ring 374 to prevent the torque adjusting ring from moving outward during its rotation along with the second output shaft 330. A large end of the second output shaft 330 is supported by the first output shaft bearing 331 at the third through hole of the assembly casing 350, and supported by the third output shaft bearing 333 and the fourth shaft bearing 334 on the third casing 530. A portion of the second output shaft between the third output shaft bearing 333 and the fourth shaft bearing 334 is provided with an outer spline on the outer surface of the second output shaft. In order to pass through the through-hole of the coupling section casing 530 during assembly, the diameter of the spline top shall not be greater than the diameter of the output end of the second output shaft 330, and the inner surface of the output gear hub of the switching assembly 320 is provided with an inner spline, and is connected with the second output shaft 330 by a spline pair.

As shown in FIG. 2, the assembly casing 350 is provided with the third flange 351 which connects with the second casing through the flange screws 352 with a preferred number of 4, thereby fixedly connecting the assembly casing and the outer casing 500.

The planetary gear coupling mechanism has two functions: first, the rotation of the B side that is transmitted by the main shaft 250 is reduced in speed and increased in torque; second, the first inner ring gear 420 inputs rotation to complete the rotation speed coupling to change the direction of the outputted rotation. The 2K-H-typed planetary gear coupling mechanism which has a large transmission ratio variation range is adopted to facilitate the achievement of the speed coupling during the dual-mode switching, and to easily match different steering motors; this planetary gear coupling mechanism has a compact structure and small size, thereby reducing the actuator volume and simplifying the matching of the whole vehicle.

As shown in FIG. 2, the planetary gear coupling mechanism mainly includes a second inner ring gear 410, a first inner ring gear 420, a ring sleeve bearing 421, an inner ring gear sleeve 422, a plurality of planetary gears 430, a planetary carrier 440, a planetary carrier bearing 441 and a sun gear 450.

The inner ring gear sleeve 422 is supported by the ring gear sleeve bearing 421 inside the third casing 530 and extends to the structural surface inside the cavity. One end of the inner ring gear sleeve 422 is fixedly connected to the second inner ring gear 410 by bonding or welding, and the other end thereof is fixedly connected to the first inner ring gear 420 by bonding or welding. The second inner ring gear 410 and the second output gear 320 are internally meshed and connected through the helical gear with a transmission ratio of $i_c$, that is, the second inner ring gear 410 drives the inner ring gear sleeve 422 to rotate, so as to drive the first inner ring gear 420 to rotate. The first inner ring gear 420 and the planetary gears 430 with a preferred number of 4 are internally meshed through the helical gear. The planetary gears 430 are rotatably sleeved on an outer surface of a pin shaft of the planetary carrier 440. The sun gear 450 is connected to the main shaft 250 of the transmission gear set through a flat key, and is externally meshed with the planetary gears 430 through a helical cylindrical gear. A blind hole is provided at an end face of the planetary carrier 440, and the planetary carrier bearing 441 is provided on an inner surface of the blind hole. The planetary carrier bearing 441 is provided on an outer surface of the main shaft 250 to support the planetary carrier 440. The other end of the planetary carrier 440 is welded or bonded with an end face of a second nut at the B side.

It can be seen that, with only one motor, the dual-mode active rear-wheel steering can be achieved under two modes of steering and braking by changing the number and the motion states of the input shafts, thereby reducing the number of motors and the system complexity and the cost.

The two rear-wheel motion conversion mechanisms of this invention adopt ball screw mechanisms, by which the rotational motion transmitted from the planetary carrier 440 and the transmission gear set is converted to the translation of the two steering tie rods 750 which are dragged. In addition, due to the self-locking effect of screw-nut pairs, the motor is allowed to be unloaded when steering and braking are not required, and due to the mechanical effect of the screw-nut, the disturbance from the road can be resisted and the working energy consumption is reduced.

In particular, the ball screws on the A and B sides have the same lead and size, but the rotation directions of the ball screws are opposite.

Figure 4:
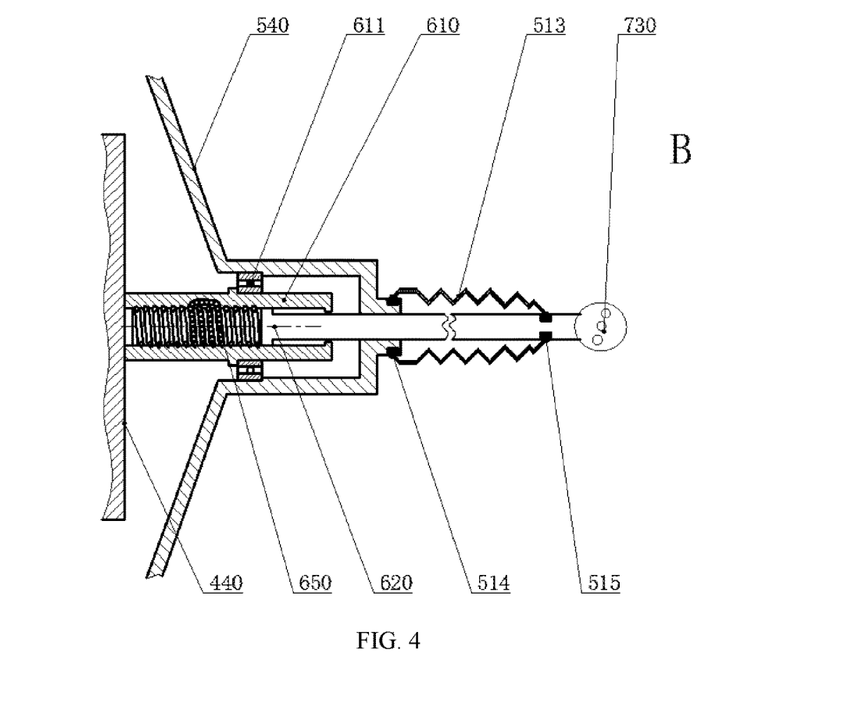
FIG. 4 is a schematic diagram of a rear-wheel motion conversion mechanism according to the invention.

FIG. 4 schematically shows the second rear-wheel motion conversion mechanism at the B side. The planetary carrier 440 is connected to the second nut 610 at the B side by welding or riveting. The outer surface of the second nut 610 is machined to a plane shaft with a boss, by which the position of a second nut bearing 611 at the B side is limited. An inner surface of the second nut bearing 611 connects to an outer surface of the second nut 610, and an outer surface of the second nut bearing 611 connects to an inner surface of the fourth casing 540. A circular-arc spiral raceway is provided at an inner surface of the second nut 610 to allow balls 650 to roll, and a corresponding circular-arc spiral raceway is provided at an outer surface of a second lead screw 620 at the B side, and the two circular-arc spiral raceways are in clearance fit to form the raceway of the balls 650. The second nut 610 is also machined with an inner cyclical raceway so that the ball can circularly roll. The second lead screw 620 slidably passes through a through hole at an end of the fourth casing 540. Ring grooves are respectively provided at an extended end of the second lead screw 620 and an edge of the fourth casing 540. A large clamp 514 and a small clamp 515 arranged in the ring grooves are configured to limit a dust-proof cover 513 at an outer surface of the second lead screw 620 to protect an interior of the two rear-wheel motion conversion mechanisms from contamination. The end of the second lead screw 620 and a movable end of the first ball pin 730 are welded into a whole.

The outer casing 500 of this invention is fixed on a tray 720 by foundation screws 710 with a preferred number of 4, and the tray 720 is welded on the subframe 770, as shown in FIG. 1. The dual-mode active rear-wheel steering device provided herein is required to be assembled in a certain order, because respective casings accommodate complex supporting structures inside, as shown in FIG. 2. Internal structures in the second casing 520 and the third casing 530 are assembled firstly, and then the first casing 510 and the motor are assembled together, and finally, the fourth casing 540 and other parts are assembled as a whole.

In the assembly of the mode switch assembly, the second input gear 310 and the second output gear 320 shall be assembled separately. The second input gear 310 is installed on the second input shaft 340 in advance. The second input shaft 340 is inserted into the second input shaft bearing 341 at a left end face of the second casing 520 and fixed on the second casing 520 by the flange screws 352. Then the main shaft 250 and the transmission gear 240 are installed. The second output gear 320 is assembled in the third casing 530 and then the third casing and the second casing are connected, so as to allow the second output shaft 330 to pass through a through hole on the third casing 530 and allow an end spline of the second output shaft 330 and a spline inside a hub of the second output gear 320 to match with each other. After that, the second main shaft bearing 252 is assembled to support the main shaft 250. The inner ring gear sleeve 422, the sun gear 450, the planetary gears 430 and the planetary carrier 440 are assembled in sequence.

In the first casing 510, the second pinion gear 270, the first gear wheel 260 and the transmission shaft 261 are firstly assembled, and then the second gear wheel 280, the first output shaft 281 and the components of the first rear-wheel motion conversion mechanism at the A side are assembled. After that, the motor is connected, and the motor output shaft 120 is connected to the first input shaft 230 through splines, and finally the second casing 520 and the first casing 510 are connected by screws. The first pinion gear 290 and the intermediate gear 220 are installed on the main shaft 250 in advance, and then the main shaft 250 extends into the first casing 510 to make the first pinion gear 290 to externally mesh with the first gear wheel 260. The first input gear 210 is installed on the first input shaft 230, and then the first input shaft 230 is inserted into an inner ring of the first input shaft bearing 231 inside the second casing 520.

The characteristic parameter a of the planetary gears is defined as a ratio of a tooth number $Z_q$ of the first inner ring gear 420 to a tooth number $Z_t$ of the sun gear 450. A tooth number of the first gear wheel 260 is $Z_{260}$. A tooth number of the first pinion gear 290 is $Z_{290}$. A tooth number of the second pinion gear 270 is $Z_{270}$. A tooth number of the second gear wheel 280 is $Z_{280}$. The working principle and the design requirement of the dual-mode active rear-wheel steering device are described as follows.

Figure 5:
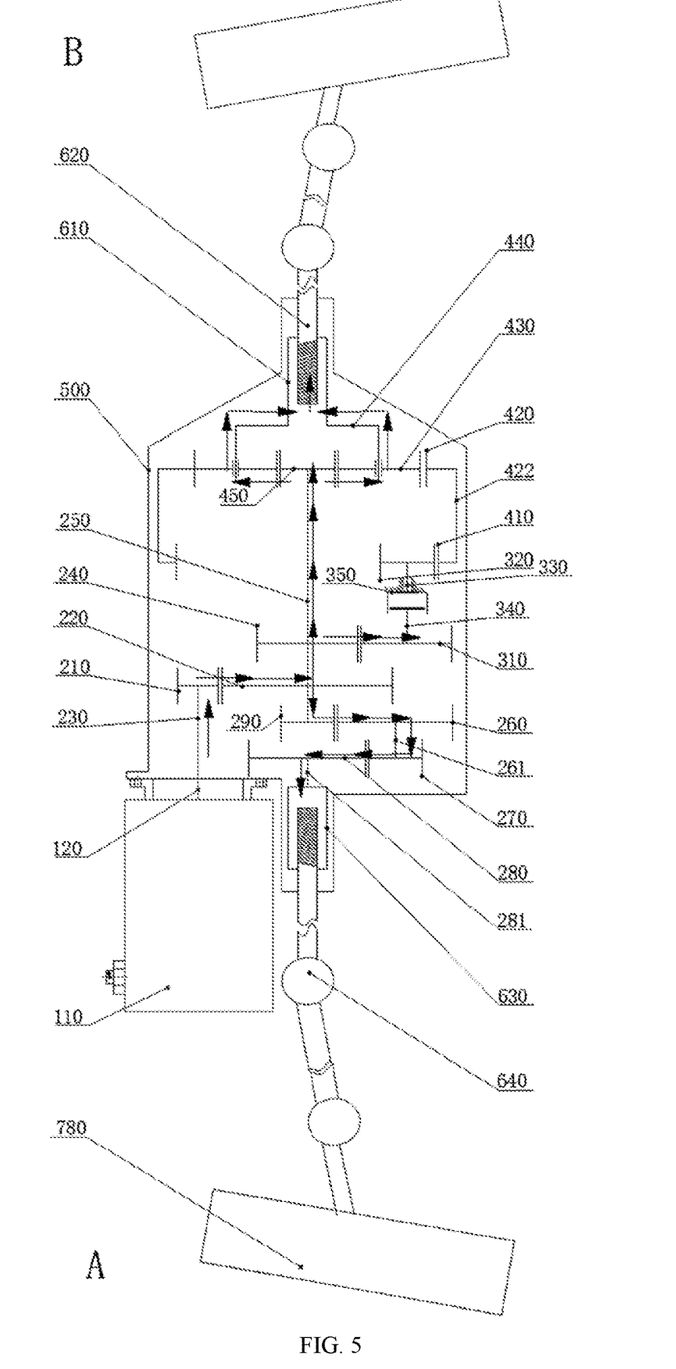
FIG. 5 schematically shows a braking principle of the dual-mode active rear-wheel steering device according to the invention.

1) When the motor rotates forward and the mode switching assembly is energized, that is, when the coil 371 is powered on to compress the magnetic yoke 370 against the casing to remain stationary, as shown in FIG. 5, the first inner ring gear 420 is locked and barred, at this time, the output speed of the planetary carrier 440 satisfies the following equation.

$$n_i = (1+\alpha)n_j \quad (1)$$

The rotational speed of a first nut 630 at the A side which equals the rotational speed of the first output shaft 281 satisfies the following equation.

$$n_A = n_t \frac{z_{290} z_{270}}{z_{260} z_{280}} \quad (2)$$

It can be seen from table 1 that under the braking mode, the translation directions of the lead screws on the A and B sides are opposite. Since the rotational directions of the ball screws on the A and B sides are opposite, the rotations of the output ends on the A and B sides have the same speed and direction. In order to keep the output ends on the A and B sides being coaxial, the tooth number of the above gears is required to satisfy the following equation.

$$\frac{z_{290} z_{270}}{z_{260} z_{280}} = \frac{1}{1+\alpha} \quad (3)$$

$$z_{290} + z_{260} = z_{270} + z_{280} \quad (4)$$

Figure 6:
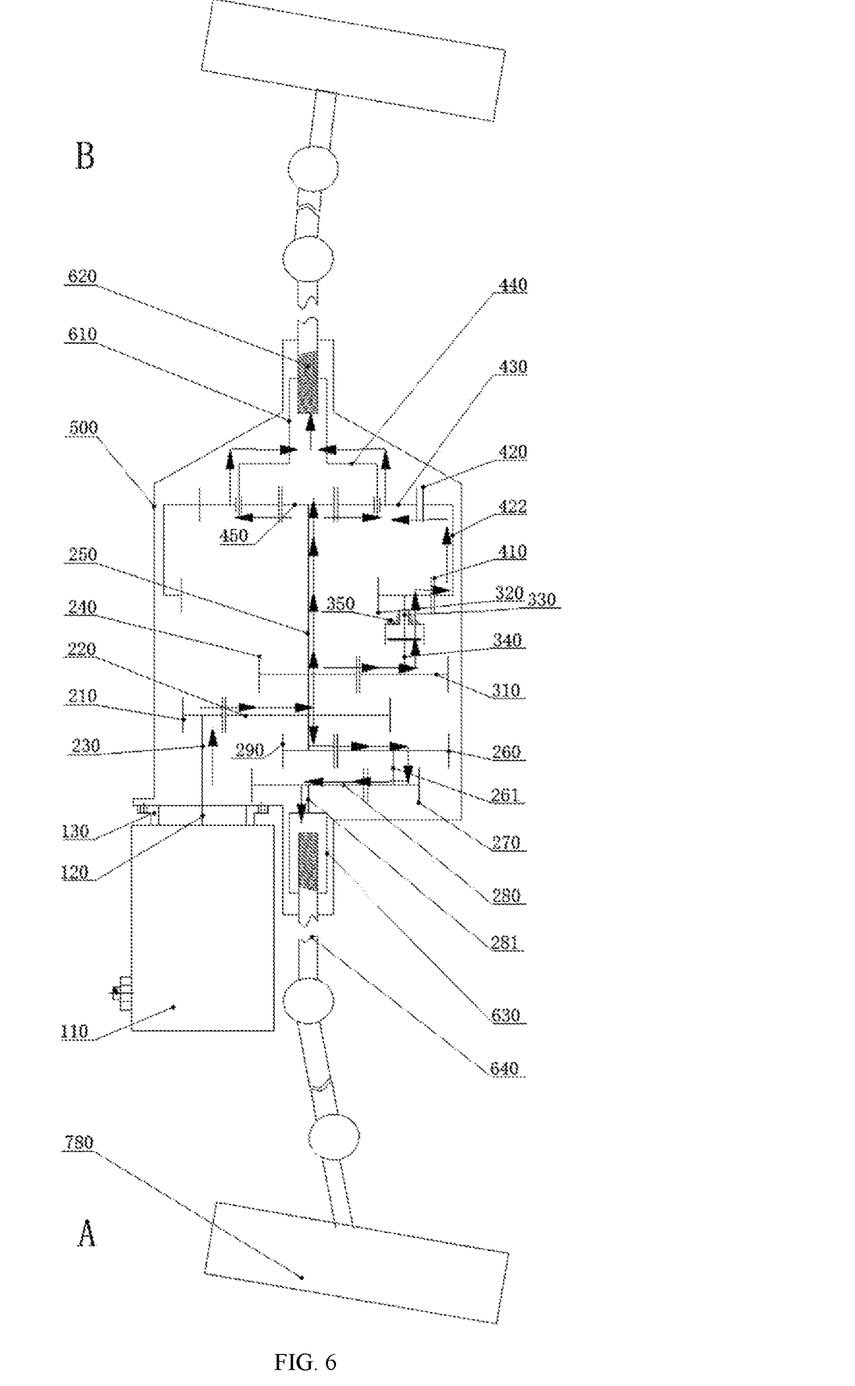
FIG. 6 schematically shows a steering principle of the dual-mode active rear-wheel steering device according to the invention.

2) When the motor rotates forward and the mode switching assembly is not energized, that is, when the magnetic yoke 370 is compressed against the second input shaft 340 by the springs 372 and follows the second input shaft 340 to rotate, as shown in FIG. 6, the second output gear 320 drives the second inner ring gear 410 to rotate, so as to allow the inner ring gear sleeve 422 to drive the first inner ring gear 420 to input rotation to the planetary gears. At this time, the planetary gear coupling mechanism is inputted with two rotational speeds of the inner ring gears and sun gear. The rotation outputted by the planetary carrier 440 satisfies the following equation, $$n_t + \alpha n_q = (1+\alpha) n_j' \quad (5)$$

where the rotational speed of the inner ring gears is related to a transmission ratio of the input and output ends of the mode switching assembly, $$n_q = \frac{n_t}{i_t i_c} \quad (6)$$

where, $i_t$ is the transmission ratio of the input end of the mode switching assembly; $i_c$ is the transmission ratio of the output end of the mode switching assembly; and the sign of $i_c$ is minus, indicating that the external meshing changes the rotational direction. It can be seen from Table 1 that under the steering mode, the translational directions of the lead screws on the A and B sides are towards the B side, however, since the rotational directions of the ball screws on both sides are opposite, the rotations outputted on the A and B sides have the same rotational speed and opposite rotational direction. Therefore, the planetary carriers output the rotations with the same speed and opposite directions, which are different from the case 1). The rotations of the A and B sides have the same speed and opposite directions. The tooth number of the input and output ends of the mode switching assembly should satisfy the following equation.

$$1 + \frac{\alpha}{i_t i_c} = -1 \quad (7)$$

3) It can be seen from Table 1 that when the motor changes the rotational direction and the mode switching assembly is not energized, compared with the case 2), only the rotational direction of the motor changes, and the rotation is transmitted along the same path, so the device is still in the steering mode, but the lead screws move towards the A side, that is, the two rear wheels are controlled to change the active steering direction by changing the rotational direction of the motor.

In summary, respective gears in the dual-mode active rear wheel steering device should be designed according to the above equations (3), (4) and (7). The ball screws on the A and B sides rotate in the opposite directions. The specific mode is selected according to the mode switching table shown in Table 1.

TABLE 1

Operation modes of respective actuators in the dual-mode active rear-wheel steering device

|  | Braking | Steering A | Steering B |
|---|---|---|---|
| Servo motor steering | + | − | + |
| Mode switching assembly | 1 | 0 | 0 |

In another embodiment, the two-stage deceleration gear set in the transmission gear set is canceled, and the rotation is directly outputted to the first nut 630 at the A side by the main shaft 250. But in this embodiment, the transmission ratio of a first ball screw at the A side is larger than that of a second ball screw pair on the side B, that is, the speed matching for the A and B sides is completed in the first rear-wheel motion conversion mechanism at the A side. In principle, the rotational speed at the A side is matched under different deceleration modes selected herein. The deceleration mode does not improve the dual-mode switching principle of the present invention, and thus, it should not be considered as an innovation of the present invention.

The dual-mode active rear-wheel steering device provided in this invention adopts the motor and the coupling mechanism to control the two rear wheels to rotate in the same direction or the opposite directions under different driving conditions, so that the active rear-wheel steering device has two modes of steering and braking. Moreover, even if the motor fails, due to the mechanical self-locking function of the screw-nut pair, the mechanical connection is ensured to be stable and reliable, ensuring the security of driving.

Described above are merely preferred embodiments of the invention, which are not intended to limit the invention, and the technical solutions of the invention can also be fully applied to various suitable fields. Any modifications made by those skilled in the art without departing from the spirit of the invention should fall within the scope of the invention defined by the appended claims.

What is claimed is:

1. A dual-mode active rear-wheel steering device, comprising:
an outer casing;
a main shaft;
an intermediate gear;
a planetary gear coupling mechanism;
a transmission gear; and
a mode switching assembly;
wherein a steering motor is fixedly provided on the outer casing, and a first input gear is coaxially arranged with and fixed on an output end of the steering motor;
the main shaft is rotatably arranged in a middle portion of the outer casing; one end of the main shaft is connected to a first rear-wheel motion conversion mechanism through a cylindrical two-stage gear transmission system to drive a first rear wheel to steer, and the other end of the main shaft is connected to a second rear-wheel motion conversion mechanism through the planetary gear coupling mechanism to drive a second rear wheel to steer;
the intermediate gear is coaxially arranged with and fixed on the main shaft; and coaxially arranged with the cylindrical two-stage gear transmission system, and meshes with the first input gear;
the planetary gear coupling mechanism comprises a sun gear, a plurality of planetary gears, a planetary carrier, an inner ring gear sleeve, a first inner ring gear, a second inner ring gear and a plurality of pin shafts;
wherein the sun gear is coaxially arranged with and fixed at the other end of the main shaft;
the inner ring gear sleeve is rotatably arranged inside the outer casing;
the first inner ring gear is provided at one side of the inner ring gear sleeve, and is concentric with the sun gear;
the plurality of planetary gears are uniformly provided outside the sun gear in a circumferential direction, and respectively mesh with the sun gear and the first inner ring gear;
the planetary carrier is coaxially arranged with the sun gear in spaced manner, and the planetary carrier and the second rear-wheel motion conversion mechanism are coaxially connected to drive the second rear wheel to rotate;
one end of each of the pin shafts rotatably passes through the corresponding planetary gear, and the other end of each of the pin shafts is fixedly provided on the planetary carrier; and
the second inner ring gear is provided on the other side of the inner ring gear sleeve;
wherein the transmission gear is coaxially arranged with and fixed on the main shaft, and is provided between the sun gear and the intermediate gear;
one end of the mode switching assembly is coaxially provided with a second input gear that meshes with the transmission gear, and the other end of the mode switching assembly is coaxially provided with a second output gear that meshes with the second inner ring gear, which is configured to selectively drive or lock the first inner ring gear;
wherein when the mode switching assembly is disconnected, the first inner ring gear is locked to the outer casing by the mode switching assembly, and the planetary carrier is driven only by the sun gear on the main shaft, and then the second rear-wheel motion conversion mechanism is driven to operate; when the mode switching assembly is connected, the main shaft drives the sun gear and the first and second inner ring gears in the mode switching assembly to realize the speed coupling, thereby driving the second rear-wheel motion conversion mechanism.

2. The dual-mode active rear-wheel steering device of claim 1, wherein the mode switching assembly comprises:
an assembly casing;
the second input gear;
a second input shaft;
a rotor friction plate;
a second output shaft;
a circular groove;
a coil;
a magnetic yoke;
a torque adjusting ring;
a stator friction plate; and
a plurality of springs;
wherein a first through hole, a second through hole and a third through hole that are coaxially arranged penetrate through a center of the assembly casing which is fixedly connected to the outer casing through a plurality of bolts;
the second input gear is arranged outside the assembly casing at an input side, and meshes with the transmission gear;
one end of the second input shaft is rotatably supported in the first through hole by a second input shaft bearing, and extends into the assembly casing; the other end of the second input shaft is coaxially connected to the second input gear via a flat key;
the rotor friction plate, which is annular, is provided in the assembly casing and is coaxially fixedly connected to an end face of the second input shaft that extends into the mode switching assembly;
one end of the second output shaft is rotatably supported in the third through hole by a first output shaft bearing, and extends into the assembly casing, and is coaxially arranged with and rotatably supported by the second input shaft; the other end of the second output shaft is coaxially connected to the second output gear via a spline;
the circular groove is coaxially provided in an inner wall of the assembly casing that is opposite to the rotor friction plate;
the coil is embedded and fixedly provided in the circular groove;
the magnet yoke is slidably sleeved on the second output shaft between the rotor friction plate and the coil by a spline pair;
the torque adjusting ring is provided in the second through hole of the mode switching assembly and a gap is arranged between the torque adjusting ring and the second through hole; a center of the torque adjusting ring is sleeved on the second output shaft through threads; an outer cylindrical surface of the torque adjusting ring is provided with adjusting teeth which force the torque adjusting ring to rotate on the second output shaft through a tool; and an end face of the torque adjusting ring facing the magnet yoke is provided with a circular-arc-shaped groove;
the stator friction plate which is annular is arranged outside the coil, and is fixedly provided on the inner wall of the assembly casing in a circumferential direction of the second through hole;

the plurality of springs are uniformly arranged around the second output shaft between the magnet yoke and the torque adjusting ring; one end of each of the springs contacts with the magnet yoke, and the other end of each of the springs is slidably contacted with the circular-arc-shaped groove of the torque adjusting ring; a pressing force of the springs is adjusted by rotating the torque adjusting ring;

wherein when the coil is energized, the magnet yoke compresses the springs, so that the magnet yoke abuts the stator friction plate, at one time, the magnet yoke is separated from the rotor friction plate and is locked by the assembly casing; when the coil is de-energized, the springs compress the magnet yoke, so that the magnet yoke abuts the rotor friction plate, and the rotor friction plate and the magnet yoke are connected to rotate synchronously.

3. The dual-mode active rear-wheel steering device of claim 2, wherein the mode switching assembly further comprises:
a boss;
a plurality of through holes;
a plurality of spring seats;
a rotor friction sheet; and
a stator friction sheet;
wherein the boss is provided on the second output shaft and located between the magnet yoke and the torque adjusting ring, and integrally formed with the second output shaft;
the plurality of through holes are uniformly provided on the boss along a circumferential direction of the boss;
each of the spring seats is a special-shaped cylinder; a plane end of each of the spring seats contacts with the other end of each of the springs, and the spring seats are arranged in corresponding through holes and are capable of moving along an axial direction of the through holes; a curved end of each of the spring seats slidably contacts with the torque adjusting ring;
the rotor friction sheet is annular and coaxially fixed on a side of the rotor friction plate which faces the magnet yoke; and
the stator friction sheet is annular and coaxially fixed on a side of the stator friction plate which faces the magnet yoke.

4. The dual-mode active rear-wheel steering device of claim 2, wherein the rotatable arrangement or supporting is achieved via bearings.

5. The dual-mode active rear-wheel steering device of claim 2, wherein transmission ratios of gears at an input end and an output end of the mode switching assembly satisfy the following equation:

$$1 + \frac{\alpha}{i_t i_c} = -1$$

wherein $i_t$ is the transmission ratio of the gears at the input end of the mode switching assembly, and $i_c$ is the transmission ratio of the gears at the output end of the mode switching assembly.

6. The dual-mode active rear-wheel steering device of claim 1, wherein the cylindrical two-stage gear transmission system comprises:
a first pinion gear;
a transmission shaft;
a first gear wheel;
a second pinion gear; and
a second gear wheel;
wherein the first pinion gear is coaxially arranged with the main shaft and located outside the intermediate gear;
two ends of the transmission shaft are rotatably arranged at the outer casing below the first pinion gear;
the first gear wheel is coaxially arranged with the transmission shaft and located under the first pinion gear, and meshes with the first pinion gear;
the second pinion gear is coaxially arranged with the transmission shaft and located outside the first gear wheel; and
the second gear wheel is arranged above the second pinion gear and meshes with the second pinion gear; the second gear wheel is coaxially arranged and fixedly connected to the first rear-wheel motion conversion mechanism.

7. The dual-mode active rear-wheel steering device of claim 6, wherein the other end of the main shaft is rotatably supported on the planetary carrier.

8. The dual-mode active rear-wheel steering device of claim 6, wherein the rotatable arrangement or supporting is achieved via bearings.

9. The dual-mode active rear-wheel steering device of claim 6, wherein the tooth number of the first pinion gear, the second pinion gear, the first gear wheel and the second gear wheel satisfies the following equations:

$$\frac{z_{290} z_{270}}{z_{260} z_{280}} = \frac{1}{1+\alpha};$$

$$z_{290} + z_{260} = z_{270} + z_{280};$$

$$\alpha = \frac{z_q}{z_t};$$

wherein $\alpha$ is the ratio of the tooth number $Z_q$ of the first inner ring gear to the tooth number $Z_t$ of the sun gear; $Z_{260}$ is the tooth number of the first gear wheel; $Z_{290}$ is the tooth number of the first pinion gear; $Z_{270}$ is the tooth number of the second pinion gear; and $Z_{280}$ is the tooth number of the second gear wheel.

10. The dual-mode active rear-wheel steering device of claim 9, wherein transmission ratios of gears at an input end and an output end of the mode switching assembly satisfy the following equation:

$$1 + \frac{\alpha}{i_t i_c} = -1$$

wherein $i_t$ is the transmission ratio of the gears at the input end of the mode switching assembly, and $i_c$ is the transmission ratio of the gears at the output end of the mode switching assembly.

11. The dual-mode active rear-wheel steering device of claim 1, wherein the first rear-wheel motion conversion mechanism is same with the second rear-wheel motion conversion mechanism; the first rear-wheel motion conversion mechanism comprises a first nut, a first lead screw, a first steering tie rod and a first dust-proof cover; the second rear-wheel motion conversion mechanism comprises a second nut, a second lead screw, a second steering tie rod and a second dust-proof cover;
wherein the first nut and the second nut are rotatably arranged on the outer casing;

one end of the first lead screw is provided in the first nut and is in clearance fit with the first nut via balls, and is capable of moving along an axial direction of the first nut, and the other end of first lead screw extends out of the outer casing; one end of the second lead screw is provided in the second nut and is in clearance fit with the second nut via balls, and is capable of moving along an axial direction of the second nut, and the other end of the second lead screw extends out of the outer casing;

one end the first steering tie rod is connected to the other end of the first lead screw via a first ball pin, and the other end of the first steering tie rod is connected to a first steering knuckle arm of a corresponding wheel via a second ball pin, thereby realizing a deflection of the wheel; one end of the second steering tie rod is connected to the other end of the second lead screw via a first ball pin, and the other end of the second steering tie rod is connected to a second steering knuckle arm of a corresponding wheel via a second ball pin, thereby realizing a deflection of the wheel; and the first dust-proof cover is sleeved on the first lead screw, and located outside the outer casing, and two ends of the first dust-proof cover are respectively fixed to the outer casing and the first lead screw via clamps; and the second dust-proof cover is sleeved on the second lead screw, and located outside the outer casing, and two ends of the second dust-proof cover are respectively fixed to the outer casing and the second lead screw via clamps.

12. The dual-mode active rear-wheel steering device of claim 11, wherein the first lead screw and the first nut of the first rear-wheel motion conversion mechanism and the second lead screw and the second nut of the second rear-wheel motion conversion mechanism have identical parameters except that rotational directions thereof are opposite.

13. The dual-mode active rear-wheel steering device of claim 11, wherein the rotatable arrangement or supporting is achieved via bearings.

14. The dual-mode active rear-wheel steering device of claim 1, wherein the other end of the main shaft is rotatably supported on the planetary carrier.

15. The dual-mode active rear-wheel steering device of claim 1, wherein the rotatable arrangement or supporting is achieved via bearings.

16. The dual-mode active rear-wheel steering device of claim 1, wherein transmission ratios of gears at an input end and an output end of the mode switching assembly satisfy the following equation:

$$1 + \frac{\alpha}{i_t i_c} = -1$$

wherein $i_t$ is the transmission ratio of the gears at the input end of the mode switching assembly, and $i_c$ is the transmission ratio of the gears at the output end of the mode switching assembly.

* * * * *